Figure 1:
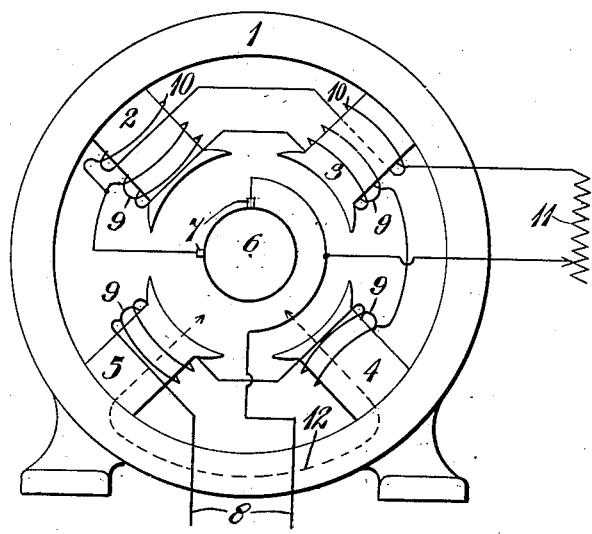

R. E. FERRIS.
DYNAMO ELECTRIC MACHINE.
APPLICATION FILED AUG. 7, 1914.

1,255,400.

Patented Feb. 5, 1918.

WITNESSES:
Fred H. Miller
W. R. Coley

INVENTOR
Ralph E. Ferris
BY
Chesley G. Carr
ATTORNEY

UNITED STATES PATENT OFFICE.

RALPH E. FERRIS, OF SWISSVALE, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,255,400.     Specification of Letters Patent.     Patented Feb. 5, 1918.

Application filed August 7, 1914. Serial No. 855,543.

*To all whom it may concern:*

Be it known that I, RALPH E. FERRIS, a citizen of the United States, and a resident of Swissvale, in the county of Allegheny and State of Pennsylvania, have invented a new and useful Improvement in Dynamo-Electric Machines, of which the following is a specification.

My invention relates to dynamo-electric machines, and it has special reference to the arrangement of magnetic field circuits in such machines.

The object of my invention is to provide relatively simple and inexpensive means of the above-indicated character, whereby certain of the field magnetic circuits may be partially or entirely separated from each other; thus the reliability of operation is increased and, in particular, at starting, the liability of the machine to "flash-over" is greatly reduced.

The usual type of compound-wound electric motors, comprises motors that are provided with both a series-connected and a shunt-connected field magnet winding that are adapted to inclose all of the polar projections, or, in the case of many motors having interpolar projections, that respectively inclose all of the polar projections and the main projections only. In such motors, the magnetic circuits of both of the field windings follow common paths in both the frame and all the polar projections of the machine in one case, or in the frame and a certain proportion, usually half, of the projections in the second case. Consequently, the inductive damping effect of the coils comprising the shunt field winding tends to greatly reduce the effective magnetic flux in the magnetic field circuit of the machine, at starting, thus giving a relatively weak field flux at the time when a strong flux is most needed to prevent the "flashing-over" of the machine on the commutator cylinder. It has been found that, irrespective of the relative capacity or strength of the series field winding, the transformer or damping action of the shunt field winding will cause the net or effective ampere-turns of the two windings to assume a relatively low value, thus preventing the establishment of a material amount of flux in the magnetic field circuit, at starting.

The relatively weak field flux referred to, as a result of its conjunction with the relatively great armature reaction at starting, becomes highly distorted, thereby causing a relatively, and sometimes an excessively, high value of voltage between commutator bars, with the consequent liability of the machine to "flash-over".

According to my present invention, I provide a dynamo-electric machine having partially or entirely separate magnetic field circuits for the series-connected and the shunt-connected field magnet windings, thereby producing a series magneto-motive force in a predetermined portion of the polar projections, and producing a shunt magneto-motive force in an unlike portion thereof. The damping effect mentioned above may thus be eliminated or materially reduced.

Figure 2:
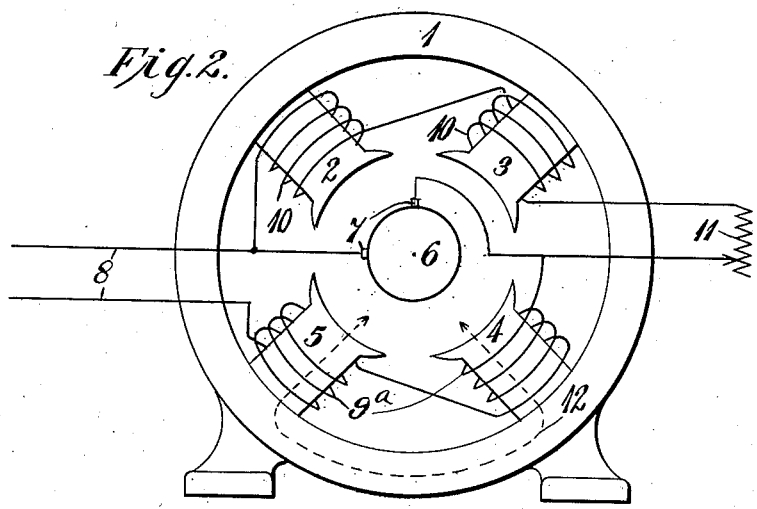

In the accompanying drawing, Figure 1 is a diagrammatic view of a dynamo-electric machine constructed in accordance with one form of my invention, and Fig. 2 is a similar view of a modification of the invention.

Referring to the drawing, the apparatus here shown comprises a dynamo-electric machine having a suitable yoke or frame 1 which is provided with a plurality of preferably main polar projections 2, 3, 4 and 5; a suitable armature disposed within the space formed by the polar projections and provided with a commutator cylinder 6 upon which brushes 7 or other suitable current-collecting devices are disposed; and a main supply circuit 8 for the machine.

Preferably, the polar projections are disposed approximately at the 45° points in the periphery of the machine, the projections 2 and 3 being thus located above the horizontal center line of the machine, while the projections 4 and 5 are correspondingly located below the center line.

All of the polar projections are provided with suitable coils of a series-connected field magnet winding 9, which extends from one side of the supply circuit 8 around the projections 5, 4, 3 and 2 in alternately opposite directions, as is customary, through the brushes 7 and the armature of the machine and back to the other side of the supply circuit. A shunt-connected field magnet winding 10 is connected from one of the brushes 7 around the adjacent polar projections 2 and 3 in directions respectively corresponding to the adjacent coils of the series-connected winding 9, through a suitable variable resistor 11 and back to the other brush 7.

Referring to Fig. 2, it will be noted that the series-connected and the shunt-connected windings of the machine shown are arranged in a different manner from those illustrated in Fig. 1. A series-connected field magnet winding 9ᵃ extends from one side of the supply circuit 8 around the adjacent polar projections 5 and 4 in opposite directions and through the armature of the machine to the other side of the main supply circuit. The shunt-connected field winding 10 is connected, in a similar manner to that described in Fig. 1, around the adjacent projections 2 and 3.

It will be noted that the construction just described allows the use of field magnetic circuits in the machine which are either partially separate from each other, as in the case of Fig. 1, or entirely separate, as in Fig. 2. In either case, a separate complete magnetic circuit, energized by the series-connected field winding, is provided, as indicated by dotted lines 12.

The operation of the machine under starting conditions, in so far as its tendency to prevent "flash-over" is concerned, is believed to have been already sufficiently set forth. However, a brief description of certain operating effects produced in the machine will be of interest. The machine is preferably designed in such manner that the electromagnetic force exerted by the upper pair of polar projections 2 and 3 will just balance the opposing force exerted by the lower pair of projections 4 and 5, when the machine is operating at or near full load conditions so that there will be no unbalanced magnetic pull. When the machine is running light, the upper pair of polar projections will probably have the stronger effect, thereby causing a "floating" tendency of the armature. However, such a condition will not have any bad effects and, in fact, will have the good effect of tending to equalize the wear on the different portions of the bearing surfaces of the armature.

I do not wish to be restricted to the specific circuit connections or arrangement of parts herein set forth, but desire that only such limitations shall be imposed as are indicated in the appended claims.

I claim as my invention:

1. In a dynamo-electric machine, the combination with a magnetizable frame having a plurality of polar projections, of a series-connected and a shunt connected field magnet winding arranged to produce a series and a compound magneto-motive force respectively in different portions of the frame and projections.

2. In a dynamo-electric machine, the combination with a plurality of polar projections, of a series-connected and a shunt-connected field magnet winding, one of which incloses each of the polar projections and the other of which incloses each of a predetermined number of adjacent projections.

3. The combination with a main supply circuit, of a dynamo-electric machine provided with a plurality of polar projections and a plurality of sets of field magnet windings respectively connected in series relation with, and in parallel relation to, said main circuit, and arranged to produce a series magneto-motive force in certain of said projections and a compound magneto-motive force in the remainder of said projections.

4. The combination with a main circuit, of a dynamo-electric machine provided with a plurality of polar projections, and means associated with said circuit and said projections for producing a series magneto-motive force in certain of said projections and a compound magneto-motive force in the remainder of said projections.

In testimony whereof, I have hereunto subscribed my name this 31st day of July 1914.

RALPH E. FERRIS.

Witnesses:
JOHN S. DEAN,
B. B. HINES.